United States Patent
Steffensen

(10) Patent No.: US 7,672,531 B2
(45) Date of Patent: Mar. 2, 2010

(54) SYSTEM AND METHOD FOR DETERMINING EDGES OF OBJECTS IN AN IMAGE

(75) Inventor: Roberto Steffensen, Ottawa (CA)

(73) Assignee: Geostudio Consultants Limited, Ottawa, Ontario (CA)

( * ) Notice: Subject to any disclaimer, the term of this patent is extended or adjusted under 35 U.S.C. 154(b) by 320 days.

(21) Appl. No.: 11/740,602

(22) Filed: Apr. 26, 2007

(65) Prior Publication Data

US 2008/0267508 A1 Oct. 30, 2008

(51) Int. Cl.
*G06K 9/40* (2006.01)
(52) U.S. Cl. .................. 382/266; 382/269; 382/274; 382/275
(58) Field of Classification Search ............ 382/266, 382/269, 274, 275
See application file for complete search history.

(56) References Cited

U.S. PATENT DOCUMENTS

| 5,559,900 | A  | * | 9/1996  | Jayant et al. ............... 382/248 |
| 6,111,994 | A  | * | 8/2000  | Katayama et al. .......... 382/298 |
| 6,661,930 | B1 | * | 12/2003 | Graham et al. ............. 382/276 |
| 7,027,054 | B1 | * | 4/2006  | Cheiky et al. .............. 345/473 |
| 7,369,284 | B1 | * | 5/2008  | Inuzuka et al. ............. 358/512 |

* cited by examiner

*Primary Examiner*—Yosef Kassa
(74) *Attorney, Agent, or Firm*—McCarthy Tétrault LLP

(57) ABSTRACT

The invention relates to a system and method of identifying an edge of an object in an image. The method comprises: identifying a segment of the image and a central pixel in the segment; identifying a set of mini-vectors as possible edges for the central pixel, utilizing a calculated gradient figure for the center pixel; and producing a reduced set of mini-vectors from the set of mini-vectors by removing mini-vectors that do not generate a continuous edge with an adjacent edge in an adjacent segment in the image.

19 Claims, 13 Drawing Sheets

| Mini-Vector | Compatible Pair of Directional Values | | Compatible Pair of Directional Values | |
|---|---|---|---|---|
| 1 | 1 | 1 | 5 | 5 |
| 2 | 3 | 3 | 7 | 7 |
| 3 | 2 | 2 | 6 | 6 |
| 4 | 4 | 4 | 8 | 8 |
| 5 | 5 | 4 | 1 | 8 |
| 6 | 5 | 6 | 1 | 2 |
| 7 | 6 | 5 | 2 | 1 |
| 8 | 4 | 5 | 8 | 1 |
| 9 | 8 | 7 | 4 | 3 |
| 10 | 3 | 2 | 7 | 6 |
| 11 | 6 | 7 | 2 | 3 |
| 12 | 7 | 8 | 3 | 4 |
| 13 | 1 | 7 | 5 | 3 |
| 14 | 3 | 1 | 7 | 5 |
| 15 | 5 | 7 | 1 | 3 |
| 16 | 3 | 5 | 7 | 1 |
| 17 | 2 | 4 | 6 | 8 |
| 18 | 4 | 2 | 8 | 6 |
| 19 | 2 | 8 | 6 | 4 |
| 20 | 8 | 2 | 4 | 6 |

| 255 | 255 | 255 | 255 | 255 | 255 | 255 | 255 | 255 | 255 | 255 | 255 | 255 | 255 | 255 | 255 | 255 | 255 | 255 | 255 | 255 | 255 | 255 |
|---|---|---|---|---|---|---|---|---|---|---|---|---|---|---|---|---|---|---|---|---|---|---|
| 255 | 255 | 255 | 255 | 255 | 255 | 255 | 229 | 229 | 220 | 223 | 221 | 219 | 215 | 228 | 254 | 255 | 255 | 255 | 255 | 255 | 255 | 255 |
| 255 | 255 | 255 | 255 | 255 | 255 | 242 | 200 | 51 | 51 | 51 | 51 | 51 | 51 | 51 | 200 | 253 | 255 | 255 | 255 | 255 | 255 | 255 |
| 255 | 255 | 255 | 255 | 255 | 242 | 200 | 51 | 189 | 229 | 225 | 224 | 227 | 225 | 189 | 51 | 192 | 252 | 255 | 255 | 255 | 255 | 255 |
| 255 |  | 255 | 254 | 242 | 200 | 51 | 189 | 243 | 243 | 243 | 243 | 243 | 243 | 243 | 200 | 51 | 195 | 251 | 255 | 254 | 255 | 255 |
| 255 | 255 | 255 | 242 | 200 | 51 | 189 | 243 | 255 | 255 | 255 | 255 | 255 | 255 | 248 | 205 | 51 | 190 | 251 | 254 | 254 | 255 |  |
| 255 | 255 | 242 | 200 | 51 | 189 | 243 | 255 | 255 | 255 | 255 | 255 | 255 | 255 | 255 | 249 | 202 | 51 | 199 | 253 | 255 | 255 |  |
| 255 | 251 | 211 | 51 | 189 | 243 | 255 | 255 | 255 | 255 | 255 | 255 | 255 | 255 | 255 | 255 | 247 | 199 | 51 | 226 | 255 | 255 |  |
| 255 | 248 | 211 | 51 | 219 | 243 | 255 | 255 | 255 | 255 | 255 | 255 | 255 | 255 | 255 | 255 | 243 | 233 | 51 | 208 | 255 | 255 |  |
| 255 | 248 | 211 | 51 | 219 | 243 | 255 | 255 | 255 | 255 | 255 | 255 | 255 | 255 | 255 | 255 | 243 | 231 | 51 | 210 | 255 | 255 |  |
| 255 | 249 | 211 | 51 | 219 | 243 | 255 | 255 | 255 | 255 | 255 | 255 | 255 | 255 | 255 | 255 | 243 | 226 | 51 | 211 | 255 | 255 |  |
| 255 | 249 | 211 | 51 | 219 | 243 | 255 | 255 | 255 | 255 | 255 | 255 | 255 | 255 | 255 | 255 | 243 | 226 | 51 | 211 | 255 | 255 |  |
| 255 | 248 | 211 | 51 | 219 | 243 | 255 | 255 | 255 | 255 | 255 | 255 | 255 | 255 | 255 | 255 | 243 | 231 | 51 | 206 | 255 | 255 |  |
| 255 | 250 | 211 | 51 | 219 | 243 | 255 | 255 | 255 | 255 | 255 | 255 | 255 | 255 | 255 | 255 | 243 | 228 | 51 | 207 | 255 | 255 |  |
| 255 | 255 | 219 | 51 | 189 | 243 | 255 | 255 | 255 | 255 | 255 | 255 | 255 | 255 | 255 | 255 | 242 | 193 | 51 | 232 | 255 | 255 |  |
| 255 | 254 | 243 | 219 | 51 | 189 | 243 | 255 | 255 | 255 | 255 | 255 | 255 | 255 |  | 255 | 244 | 200 | 51 | 222 | 255 | 255 | 255 |
| 255 | 255 | 255 | 243 | 219 | 51 | 189 | 243 | 255 | 255 | 255 | 255 | 255 | 255 | 255 | 243 | 198 | 51 | 219 | 255 | 255 | 255 |  |
| 255 | 255 | 253 | 255 | 242 | 219 | 51 | 189 | 243 | 245 | 244 | 243 | 244 | 246 | 237 | 198 | 51 | 220 | 255 | 255 | 255 | 255 |  |
| 255 | 255 | 255 | 255 | 255 | 244 | 219 | 51 | 200 | 200 | 200 | 200 | 200 | 200 | 200 | 51 | 219 | 255 | 254 | 255 | 255 | 255 |  |
| 255 | 255 | 255 | 255 | 255 | 255 | 244 | 219 | 51 | 51 | 51 | 51 | 51 | 51 | 51 | 225 | 255 | 254 | 250 | 255 | 255 | 255 |  |
| 255 | 255 | 255 | 255 | 255 | 255 | 255 | 255 | 227 | 227 | 227 | 227 | 227 | 227 | 227 | 255 | 255 | 254 | 255 | 255 | 255 | 255 |  |
| 255 | 255 | 255 | 255 | 255 | 255 | 255 | 255 | 255 | 255 | 255 | 255 | 255 | 255 | 255 | 255 | 255 | 255 | 255 | 255 | 255 | 255 |  |
| 255 | 255 | 255 | 255 | 255 | 255 | 255 | 255 | 255 | 255 | 255 | 255 | 255 | 255 | 255 | 255 | 255 | 255 | 255 | 255 | 255 | 255 |  |

| 1 | 2 | 3 |
|---|---|---|
| 4 | 5 | 6 |
| 7 | 8 | 9 |

502

| 255 | 255 | 255 |
|---|---|---|
| 223 | 221 | 219 |
| 51 | 51 | 51 |

| | | | | | | | | | | | | | | | | | | | |
|---|---|---|---|---|---|---|---|---|---|---|---|---|---|---|---|---|---|---|---|
| | | | | | 134 | 199 | 201 | 202 | 202 | 202 | 200 | 191 | | | | | | | |
| | | | | 144 | 250 | | 2 | 2 | 3 | 6 | 6 | 17 | 255 | 82 | | | | | |
| | | | 144 | 255 | 16 | 164 | 188 | 191 | 191 | 190 | 190 | 156 | | 255 | 142 | | | | |
| | | 144 | 255 | 16 | 255 | 75 | | | | | | 61 | 255 | 13 | 255 | 141 | | | |
| | | 144 | 255 | 16 | 255 | 144 | | | | | | | 140 | 255 | 16 | 255 | 137 | | |
| | 136 | 255 | 16 | 255 | 144 | | | | | | | | 141 | 255 | | 255 | 57 | | |
| 41 | 197 | | 162 | 68 | | | | | | | | | 57 | 160 | | 186 | | | |
| 44 | 197 | 8 | 192 | 35 | | | | | | | | | 22 | 190 | 21 | 202 | | | |
| 44 | 197 | 8 | 192 | 34 | | | | | | | | | 24 | 190 | 21 | 203 | | | |
| 44 | 198 | 8 | 192 | 34 | | | | | | | | | 29 | 192 | 15 | 204 | | | |
| 44 | 198 | 8 | 192 | 35 | | | | | | | | | 29 | 192 | 15 | 204 | | | |
| 43 | 197 | 8 | 192 | 36 | | | | | | | | | 24 | 189 | 21 | 203 | | | |
| 42 | 197 | 8 | 192 | 36 | | | | | | | | | 25 | 189 | 21 | 203 | | | |
| | 191 | 27 | 162 | 68 | | | | | | | | | 63 | 156 | 38 | 179 | | | |
| | 142 | 255 | 42 | 255 | 144 | | | | | | | | 142 | 255 | 34 | 255 | | | |
| | 143 | 255 | 42 | 255 | 144 | | | | | | | 144 | 255 | 29 | 255 | | | | |
| | | 144 | 255 | 42 | 255 | 53 | 54 | 54 | 54 | 54 | 53 | 136 | 255 | 30 | 255 | | | | |
| | | | 144 | 255 | 35 | 192 | 193 | 193 | 192 | 193 | 193 | 186 | 33 | 255 | | | | | |
| | | | | 144 | 255 | 27 | 27 | 27 | 27 | 27 | 27 | 27 | 255 | | | | | | |
| | | | | | 204 | 204 | 204 | 204 | 204 | 204 | 204 | | | | | | | | |

SYSTEM AND METHOD FOR DETERMINING EDGES OF OBJECTS IN AN IMAGE

FIELD OF INVENTION

The invention described herein relates to a system and method for determining edges of objects in an image. In particular, the invention relates to a system and method for processing objects in an image to determine boundaries defined by the objects.

BACKGROUND

In mathematical terms, an object in an image may be defined as a homogenous agglomerate of pixels within which any variation among pixels in terms of both intensity and colour is attributable to noise only. An edge of an object is defined as a zone of contact separating that object from a different object. In digital images, a part of an edge may be a zone comprising several pixels. For the zone, the more pixels that it covers, the corresponding edge defined in the zone becomes less well defined.

Manipulation of objects in a digitized image is a tool commonly used in present-day image processing systems. In such systems, identification of an accurate edge of an object in an image may be necessary, e.g. object selection operations.

In current edge-detection algorithms, gradient values for the pixels of objects are a key calculation. Current edge-detection processes may produce a sub-image of an image, where edges in the sub-image are calculated with thick "lines" showing a central higher gradient core surrounded on both sides by lower gradient pixels. However, a well-defined central high-gradient element is found only for sharper, more distinct, edges. As such, for the purpose of reducing an edge zone to a line (where a line in a raster configuration is represented by a continuous, uninterrupted sequence of single pixels), comparing a gradient value of pixels in an edge zone against a threshold may not provide satisfactory results.

There is a need for a system and method for detecting edges of objects that improves upon the prior art.

SUMMARY

An embodiment of the invention provides an edge-tracing process for objects in an image. Edge tracing is applied to gradient sub-images and consists of locating the "crest" line of high-gradient features. An embodiment may execute four stages.

In the first stage, each pixel of an image is analyzed to obtain a gradient magnitude factor and a directional orientation factor. The directional orientation factor indicates in which direction the greatest bright to dark intensity variation occurs around the pixel. Data relating to these magnitude and directional orientation factors are stored for further analysis.

In the second stage, gradient and directional factors of each pixel of an image are compared to the gradient and directional factors of its eight neighbouring pixels to identify a set of mini-vectors, which are each made up of three high-gradient pixels compatible in terms of directionality. These mini-vectors in succession make up the edge lines.

In the third stage, these sets of mini-vectors are further analyzed to reduce the number of potential mini-vectors and consequently the thickness of the edge lines.

In the fourth and last stage, the selected mini-vectors are further analyzed to reduce the thickness of the associated edge lines to a single pixel.

In a first aspect of an embodiment, a method of identifying an edge of an object in an image is provided. The method comprises: identifying a pixel-array (segment) of the image and a central pixel in the array; identifying a set of mini-vectors as possible edges for the central pixel, utilizing a calculated gradient figure for the center pixel; and producing a reduced set of mini-vectors for the central pixel from the set of mini-vectors by removing mini-vectors that do not generate a continuous edge with an adjacent mini-vector edge in an adjacent pixel-array in the image.

The method may further comprise analyzing the reduced set of mini-vectors to attempt to eliminate excess width from the identified edge.

In the method, identifying said set of mini-vectors as possible edges of the object for the pixel-array may further comprise utilizing direction data associated with the central pixel.

In the method, identifying said set of mini-vectors as possible edges of the object for the pixel-array may comprise: comparing local gradient values in overlapping sections in the pixel-array; computing differences of the local gradient values between overlapping sections; and adding the differences to compute the calculated gradient for the center pixel.

In the method, the pixel-array may be a square-shaped; and the overlapping sections may be smaller squares and the pixel-array and each overlapping section may include the center pixel.

In the method, intensity values of pixels in each section may be used to determine the local gradient for the section; the differences may be adjusted by a factor to account for the distance between the overlapping sections; the differences may be added in pairs to produce gradient figures for the sections; and the largest gradient figure of the gradient figures may be selected as the calculated gradient for the center pixel.

In the method, the second largest gradient figure of the gradient figures for the center pixel may be retained for further assessment.

In the method, the reduced set of mini-vectors having directionally compatible pixels may be produced by: comparing the direction value of the central pixel against directional values of the two other pixels at the ends of a particular mini-vector to determine directional compatibility of that particular mini-vector for the central pixel; and removing the particular mini-vector from the set of mini-vectors if it is not sufficiently compatible.

In the method, the reduced set of mini-vectors may be further identified by: comparing the mini-vectors in set against two mini-vectors that flank each side of a central mini-vector positioned centrally in the pixel-array; and computing mini-vector averages these flanking mini-vectors by adding intensity values of those pixels that are directionally compatible with pixels in the central mini-vector.

In a second aspect, a computer for identifying an edge of an object in an image is provided. The computer comprises: a display for displaying the image; memory to store a digital representation of the image; a microprocessor; and software operating on said microprocessor. The software has: a module to access the digital representation of the image and to identify a pixel-array of the image and a central pixel in the pixel-array; a module to identify a set of mini-vectors as possible edges for the central pixel, utilizing a calculated gradient figure for the center pixel; and a module to produce a reduced set of mini-vectors from the set of mini-vectors by removing mini-vectors that do not generate a continuous edge with an adjacent edge in an adjacent pixel-array in the image.

The software may further comprise a module to analyze the reduced set of mini-vectors to attempt to eliminate excess width from the identified edge.

In the computer, the module to identify the set of mini-vectors may utilize direction data associated with the central pixel.

The module to identify the set of mini-vectors as possible edges of the object for the pixel-array may: compare local gradient values in overlapping sections in the pixel-array; compute differences of the local gradient values between overlapping sections; and add the differences to compute the calculated gradient for the center pixel.

In the computer, the pixel-array may be a square-shaped; the overlapping sections may be smaller squares and the pixel-array and each overlapping section may include the center pixel; intensity values of pixels in each section may be used to determine the local gradient for the section; the differences may be adjusted by a factor to account for the distance between the overlapping sections; the differences may be added in pairs to produce gradient figures for the sections; and the largest gradient figure of the gradient figures may be selected as the calculated gradient for the center pixel.

In the computer, the second largest gradient figure of the gradient figures for the center pixel may be retained in the memory for further assessment.

The module to produce the reduced set of mini-vectors may: compare the direction value of the central pixel against directional values of the two other pixels at the ends of a particular mini-vector to determine directional compatibility of that particular mini-vector for the central pixel; and remove the particular mini-vector from the set of mini-vectors if it is not sufficiently compatible.

The module to produce the reduced set of mini-vectors may further identify same by: comparing the mini-vectors in set against two mini-vectors that flank each side of a central mini-vector positioned centrally in the pixel-array; and computing mini-vector averages these flanking mini-vectors by adding intensity values of those pixels that are directionally compatible with pixels in the central mini-vector.

In other aspects various combinations of sets and subsets of the above aspects are provided.

BRIEF DESCRIPTION OF THE DRAWINGS

The invention will now be described, by way of example only, with reference to the accompanying drawings, in which:

FIG. 3B is a table representing compatible directions for each of the 20 mini-vectors of FIG. 3A;

FIG. 4B a scale reduced duplicate of FIG. 4A displaying actual intensity values;

FIG. 7A is a table of edge-intensity values of the image of FIG. 4B as generated by the image processing software of FIG. 1A alter executing the second stage in its process as shown in FIG. 2;

FIG. 7B is a table of directional values of the image of FIG. 4B as generated by the image processing software of FIG. 1A after executing the second stage in its process as shown in FIG. 2;

FIG. 9 is a table of mini-vector descriptor codes of edges identified for the image of FIG. 4B as produced by the image processing software of FIG. 1A after executing the fourth stage in its process as shown in FIG. 2;

DESCRIPTION OF EMBODIMENTS

Figure 1A:
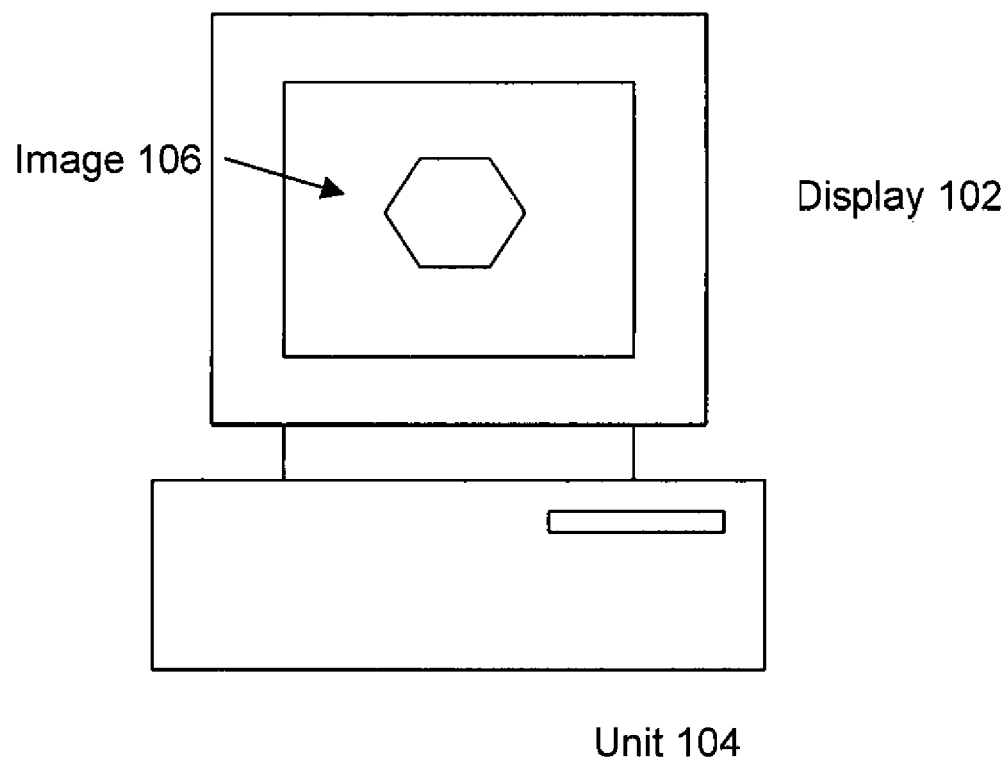
FIG. 1A is a block diagram of a computer executing image processing software in accordance with an embodiment.

The description which follows and the embodiments described therein are provided by way of illustration of an example or examples of particular embodiments of the principles of the present invention. These examples are provided for the purposes of explanation and not limitation of those principles and of the invention. In the description which follows, like parts are marked throughout the specification and the drawings with the same respective reference numerals.

For the ease of reference, the following terms are defined herein are used as appropriate in this description. It will be appreciated that to those of skill in the art the definitions are not limiting in scope and provide an exemplary meaning for the related terms. Other contexts may be provided for the terms as is known to a person of skill in the art.

Crest line pixel: A pixel surrounded by neighbouring pixels that have an average "lower value" in terms of brightness.

Trough line pixel: A pixel surrounded by neighbouring pixels that have an average "higher value" in terms of brightness.

Directional pixel value: A number between 1 and 8 indicating the side of a pixel from which the largest brightness variation from bright to dark occurs.

Mini-vector: A two-segment line connecting a pixel to two pixels among its eight neighbours that are not adjacent between themselves.

Centrally located mini-vector: A mini-vector that passes through the central pixel of a 3×3 array.

Referring to FIG. 1A, computer system 100 is shown comprising display 102 and main processing unit 104. On display 102, image 106 is generated according to an embodiment through image processing software executed within unit 104.

Figure 1B:
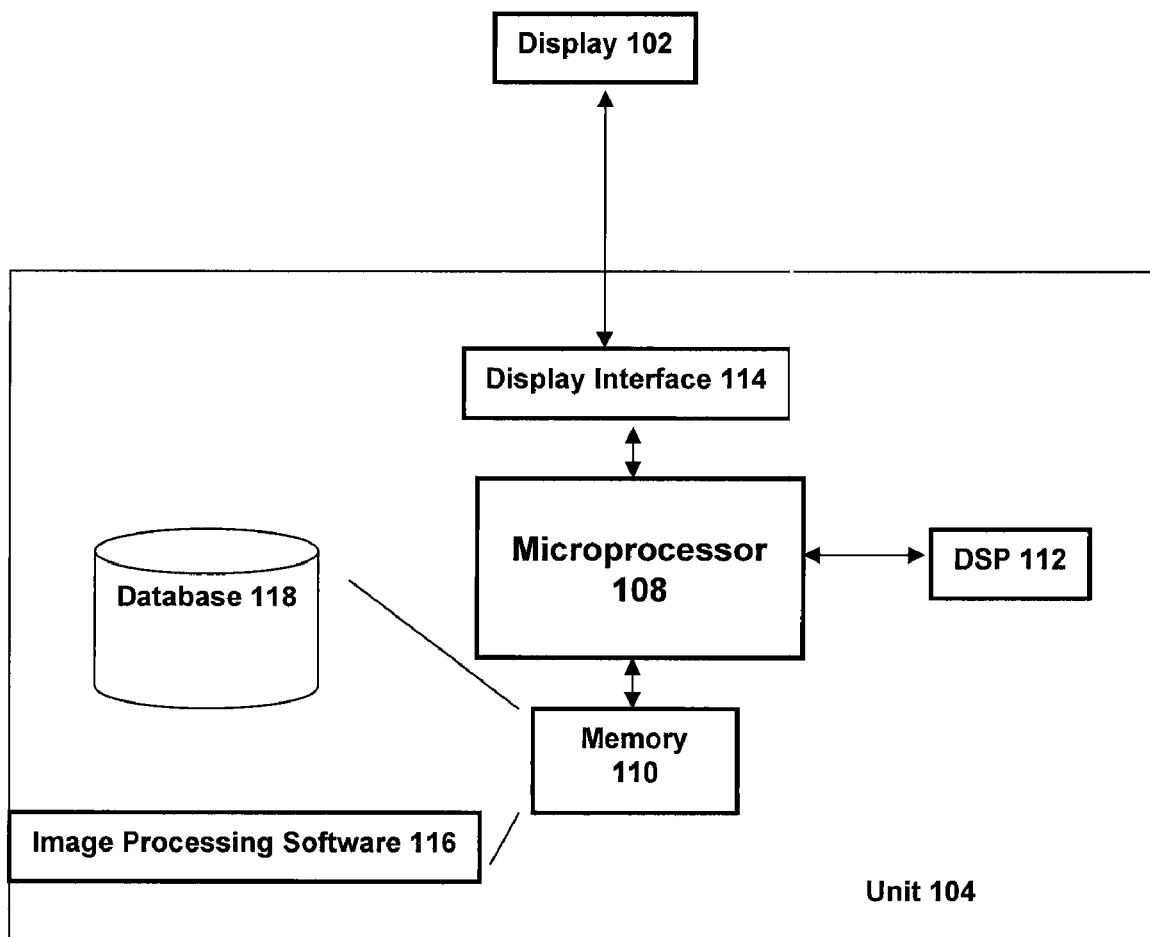
FIG. 1B is a block diagram of internal components of the computer and components of the image processing software of FIG. 1A.

Referring to FIG. 1B, further detail is provided on operational components of unit 104, comprising many of known components of a typical desktop computer, albeit with sufficient computational power. At the heart of unit 104 is microprocessor 108, which executes commands provided by software and generally processed inputs and outputs for unit 104 to effectively control the operation of unit 104 and to produce image 108 on display 102. Exemplary microprocessors include those available from Intel and Advanced Micro Devices. In addition to microprocessor 108, other internal components of unit 104 include: storage memory 110, digital signal processor (DSP) 112 and display interface 114. Memory 110 may be a combination (in different storage devices) of flash memory, random access memory (RAM), read-only memory (ROM), hard disk storage, electrically erasable programmable memory (EEPROMs) and other electronic storage devices.

Operating system software executed by microprocessor 108 is preferably stored in a computer readable medium, such as flash memory in memory 110, but may be stored in other types of memory devices, such as read only memory (ROM). Image processing software 116 that operates at least part of the analysis and calculations relating to an embodiment is also stored in an appropriate memory device in memory 110. Image processing software 116 may utilize additional libraries, subroutines and data that may be stored in database 118, which again, may be stored in memory 110.

Image processing software 116 may have parts of its algorithms or calculations executed on microprocessor 108 and/or DSP 112. Additional data may be received from external devices (not shown) that are in communication with unit 104. Image processing software 116 generates through microprocessor 108 a series of commands and data that is provided to display card 114, which then provides appropriate display commands and data to display 102.

Figure 2:
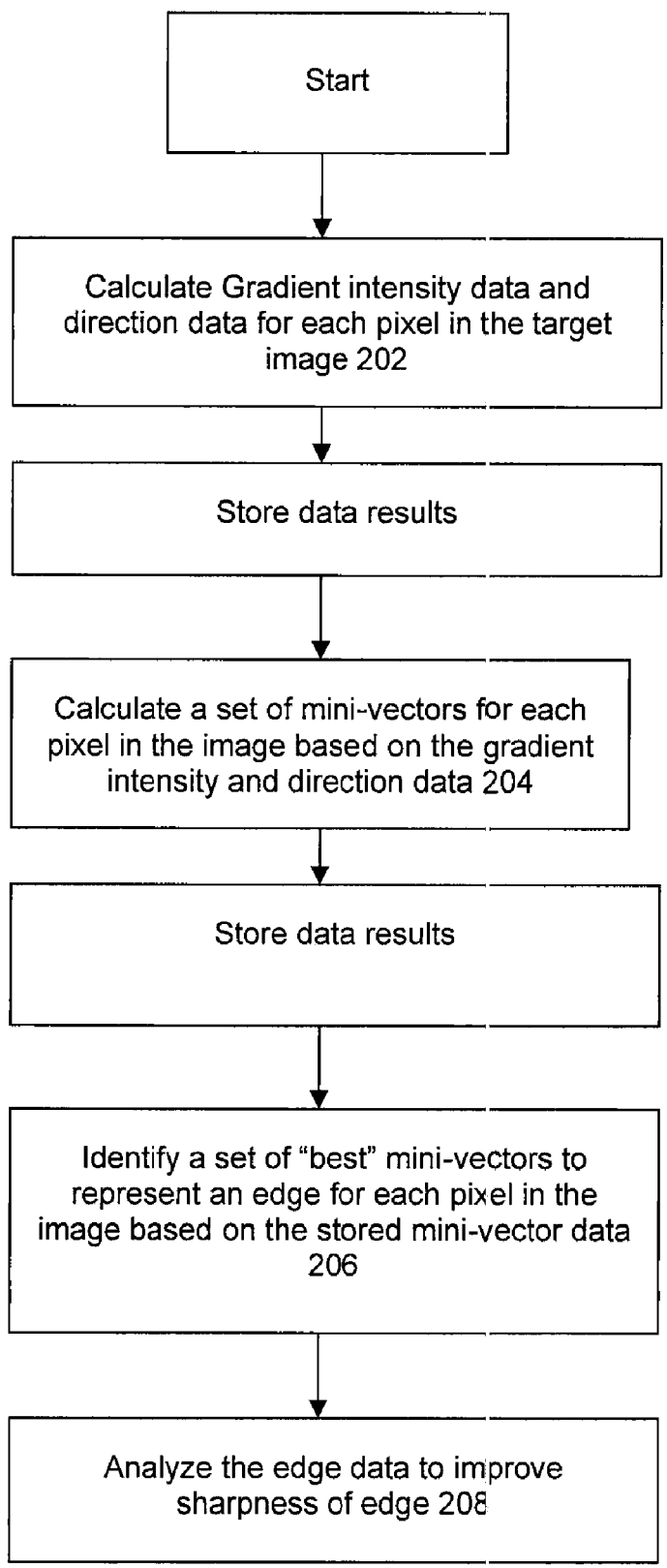
FIG. 2 is a flow chart of an exemplary process executed by the image processing software of FIG. 1A according to an embodiment, showing execution of four separate stages.

Referring to FIG. 2, further details on an embodiment are provided. In processing a target image, process 200 may be implemented in image processing software operating on unit 104, to evaluate gradient calculations and directionality data when analyzing the pixels of the image in order to determine the edges of objects.

Process 200 employs a "moving window" 3×3 pixel-array to process image data. The window is moved sequentially from the top to the bottom of the image line-by-line (scanning left to right), pixel-by-pixel. Each pixel of a raster line is analyzed together with the previous and subsequent pixel along the raster line, and the three corresponding pixels on the lines above and below. A window will overlap with windows centered on neighbouring pixels, therefore each window will have pixels in common with the windows centered on each of its eight neighbours. All processing is done with window data and the results are attributed to the central pixel of the array. Artificial data are used to fill in pixel values for the missing values in the arrays occurring at the first and last pixel of a line and first and last line of the image. These artificial data are actually duplicates of neighbouring pixels in the array.

Process 200 implements four main image processing stages to identify one or more edges using techniques and data following an embodiment. First stage 202 calculates or identifies an intensity gradient value and a direction value for each pixel in the target image. Second stage 204 identifies a set of possible mini-vector(s) for each pixel to identify possible edges for each pixel, using intensity and direction values, as appropriate. Third stage 206 selects an appropriate set of mini-vector from the set of mini-vectors to identify the "best" edge lines. Fourth stage 208 refines the edge identified in stage 206 to "sharpen" the edge. Each stage is described in turn, briefly, then as an example of an application an image processing algorithm according to an embodiment is provided. It will be appreciated that some of the stages may be combined with other stages. In some embodiments, some stages may be skipped or reduced.

For first stage 202, an embodiment calculates an image intensity and direction value of a pixel of an image by calculating a set of gradient values computed from variations in image intensities from neighbouring pixels. To determine these values, processing is done using a 3×3 matrix structure which encompasses the pixel, placed in the center, and its eight surrounding neighbours. In other embodiments, other sizes of a matrix may be used; generally the matrix will have a square shape and will have one center pixel. Intensity variations are measured by calculating intensity differences. Intensity differences are calculated for the eight major Cartesian directions: north (1), northeast (2), east (3), southeast (4), south (5), southwest (6), west (7), and northwest (8). Numbers in brackets represent the numerical encoding of directional values used by an embodiment. Intensity values may be set on an 8-bit grey scale element in a range from 0 to 255, where 0 is black and 255 is (the brightest) white.

Second stage 204 determines a set of mini-vectors for a pixel, based on gradients and directionality data provided by stage 202. A mini-vector consists of a two-segment line connecting a pixel to two of its neighbours and forming an angle in of less than 90 degrees. The directionality element of the mini-vector is represented by the direction value attached to each of the three pixels of the mini-vector by stage 202. It will be seen that there are 20 possible mini-vectors within a 3×3 matrix that connect the central pixel of the matrix to its eight neighbours, as shown on FIG. 3A. When placed on a crest line of gradient intensity data, these mini-vectors represent primary edge-line elements. It will be appreciated, that in other embodiments, fewer mini-vector types may be provided, which would have the effect of providing a more coarse definition of an edge for objects. There are also 20 mini-vectors patterns within the 3×3 matrix that can be reckoned not to include the central pixel. Since processing is done by overlapping windows, these mini-vectors, which we will call auxiliary as compared to the primary set that includes the central pixel of the array, may actually represent primary mini-vectors for one of the eight neighbouring pixels. It will be appreciated that the term "mini-vector" captures any assortment of lines, curves, vectors and segments thereof, that may be used to represent one type of line that defines an edge for the particular pixel and its surrounding neighbours. The illustrated mini-vectors shown herein are not meant to be limiting to other possible implementations of additional mini-vectors for an embodiment.

For third stage 208, a third module in image processing software 116, analyzes the identified primary mini-vectors for a given pixel, compares them with primary mini-vectors of adjacent pixels and, by eliminating those mini-vectors that do not properly connect, identifies a reduced set of mini-vectors to use, which represents the "best" line of separation (i.e. edge line) of different objects in the target image. Ultimately, the edge of an object in the image will be comprised of a collection of connected mini-vectors.

For fourth stage 210, a fourth module in image processing software 116 analyzes the resulting mini-vectors for regions of an identified edge of an image to produce a single-pixel continuous edge line. The resulting data for the identified edge can then be incorporated into the original image or be used to generate separate images, as required.

Figure 4A:
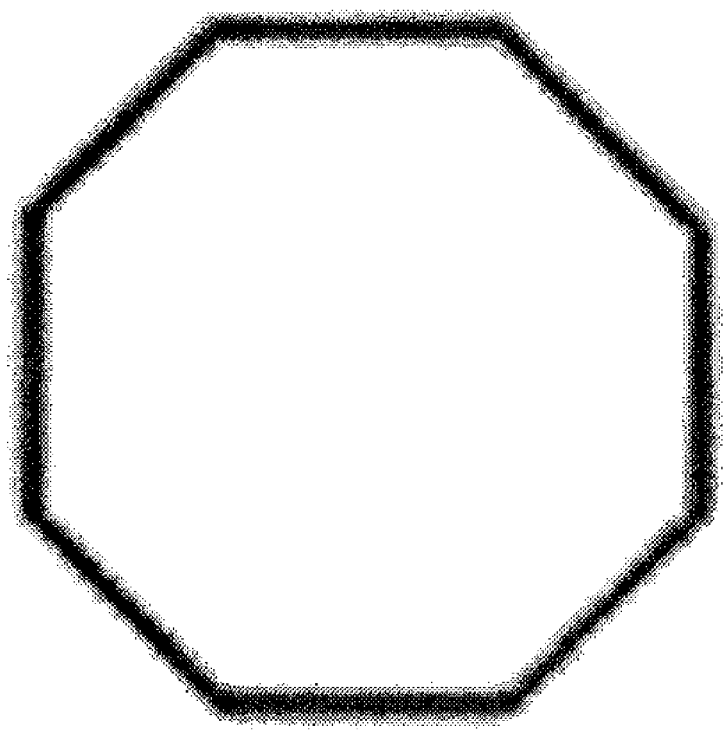
FIG. 4A is an image of a test object analyzed by the image processing software of FIG. 1A using the process of FIG. 2.

Now, referring to FIGS. 4A and B, further detail on aspects of an image processing system and method according to an embodiment, including the above noted four stages, are provided through an example. In FIG. 4A an image of an octagon 400 is shown, which is a regular, eight-sided polygon, contained within a 108×108 pixel image. In FIG. 4B, a 23×23 scale reduced image of the same is represented numerically. Each pixel in this image is assigned a greyscale value ranging from 0 to 255, where 0 is total black and 255 is the brightest defined white. In between values represent shades of black through grey to white. Each of the stages executed by image software module 116 is described in turn in further detail.

Figures 5A, 5B, 6:
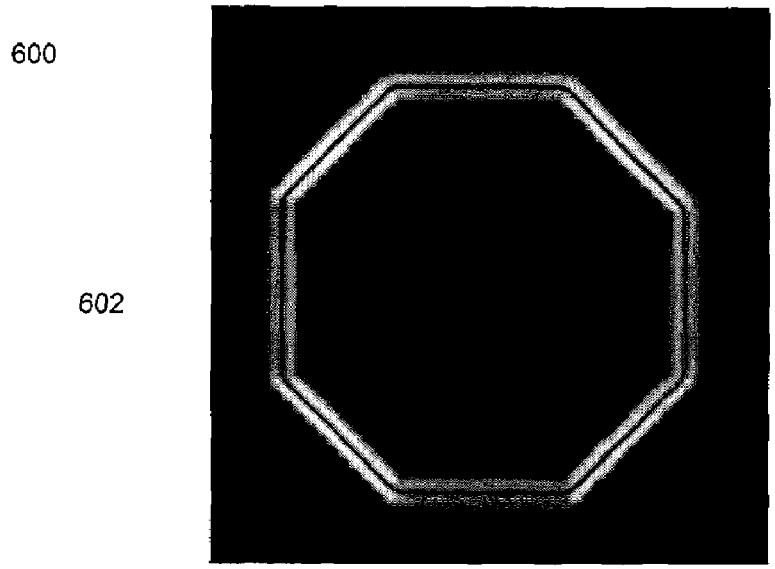
FIG. 5A is a block diagram of a pixel array used to evaluate each pixel of the images of FIGS. 4A and 4B, by the image processing software of FIG. 1A using the process of FIG. 2.
FIG. 5B is a block diagram of gradient intensity values of a region of the image of FIG. 4B used by the image processing software of FIG. 1A using the process of FIG. 2.
FIG. 6 is a representation of an image identifying edges for the test object of FIG. 4A generated by the image processing software of FIG. 1A after executing the first stage in its process as shown in FIG. 2.

Referring to FIG. 5B, further detail is provided on first stage 202 of the image processing software. As noted, stage 202 determines the gradient and directional value of each pixel in the image. In order to facilitate calculation of the gradient and directional values for a pixel, a (square) array of pixels that surround the pixel under test is defined. Array 500 is implemented as a 3×3 pixel array. For ease of processing, each cell of array 500 is labelled sequentially from 1 to 9, from the top to bottom, from left to right as shown on FIG. 5A.

To assist with calculating a gradient for a pixel, array 500 of a pixel under test is divided into a series of overlapping sections. Each overlapping section should be the same dimensions. The degree of overlapping may vary among embodiments. For an embodiment, array 500 is divided into four equally sized quadrangles. Each quadrangle is a block of four pixels in a 2×2 sub-array of array 500. As such, there are the following quadrangles:

Quad (rangle) 1 occupies the upper left portion of array 500 and includes pixels in cells 1, 2, 4 and 5 of FIG. 5A;

Quad 2 occupies the upper right portion and includes pixels in cells 2, 3, 5 and 6;

Quad 3 occupies the lower left portion and includes pixels in cells 4, 5, 7 and 8; and Quad 4 occupies the lower right portion and includes pixels in cells 5, 6, 7 and 9.

It is noted that each quadrangle includes the central pixel in cell 5. In other embodiments, different arrangements of sections may be defined. The sections may or may not be identical in size and may or may not include the center pixel. For the purpose of ease of description, the description refers to a quadrangle (or "quad") as a section that is used to provide further analysis on gradient data for the relevant pixel.

Within each quadrangle, a series of intensity difference values between intensity values found within a quadrangle may be calculated by the image processing software to determine a local gradient value for each quadrangle and for each of eight directions. In the embodiment, the following differences are calculated.

Difference 1 relates to the calculated difference in intensity values of the top row in the quadrangle from the bottom row;

Difference 2 relates to the difference in intensity values of the upper right cell to bottom left cell;

Difference 3 relates to the calculated difference in intensity values of the right column from the left column;

Difference 4 relates to the difference in intensity values of the lower right cell from the upper left cell;

Difference 5 relates to the difference in intensity values of the bottom row from the top row;

Difference 6 relates to the difference in intensity values of the lower left cell to top right cell;

Difference 7 relates to the calculated difference in intensity values of the left column from the right column; and Difference 8 relates to the difference in intensity values of the upper left cell from the lower right cell.

Referring to FIG. 5B, further detail is provided on the first stage 202 of the image processing software. Therein, image processing software 116 analyzes the intensity values for each cell to calculate a set of intensity difference values for each of the four quadrangles. From the difference calculations, using the cell values as defined in graph 502, eight difference values can be calculated for quadrangle 1 of an edge pixel located at the top of FIG. 4B (shaded area), as follows.

| Cartesian Directions | Calculation of Difference values (0.707 = sin 45 degrees). Differences shown are for Quad 1 | Result |
| --- | --- | --- |
| (1) | Min (Cell 1 – Cell 4, Cell 2 – Cell 5, Cell 1 – Cell 5, Cell 2 – Cell 4) | 32 |
| (2) | 0.707 * Min (Cell 2 – Cell 1, Cell 2 – Cell 5) + Min (Cell 1 – Cell 4, Cell 5 – Cell 4) | –1.414 |
| (3) | Min (Cell 2 – Cell 1, Cell 5 – Cell 4, Cell 2 – Cell 4, Cell 5 – Cell 1) | –34 |
| (4) | 0.707 * Min (Cell 5 – Cell 2, Cell 5 – Cell 4) + Min (Cell 2 – Cell 1, Cell 4 – Cell 1) | –46 |
| (5) | Min (Cell 4 – Cell 1, Cell 5 – Cell 2, Cell 4 – Cell 2, Cell 5 – Cell 1) | –34 |
| (6) | 0.707 * Min (Cell 4 – Cell 1, Cell 4 – Cell 5) + Min (Cell 1 – Cell 2, Cell 5 – Cell 2) | –46.662 |
| (7) | Min (Cell 1 – Cell 2, Cell 4 – Cell 5, Cell 1 – Cell 5, Cell 4 – Cell 2 | –32 |
| (8) | 0.707 * Min (Cell 1 – Cell 2, Cell 1 – Cell 4) + Min (Cell 2 – Cell 5, Cell 4 – Cell 5) | 1.414 |

The sin factor is used to provide a weighting factor to a pixel that is on a diagonal from the center pixel. Other weighting factors can be used to emphasize or de-emphasize neighbouring pixels according to requirements for particular edge tracing algorithms for different embodiments.

Next, the computed difference values for the direction values (1) to (8) for each of the four quadrangles are added to determine a total gradient value for the pixel in cell 5. In an embodiment, quadrant intensity values are added in pairs. For each of the two vertical (1 and 5) and horizontal directions (3 and 7), two pairs of values for each direction are added for a total number of eight values. As an example, for the Top to Bottom direction (1), the added values are:

Quad 1+Quad 3; and

Quad 2+Quad 4.

For each of the four diagonal directions (2, 4, 6, 8), two pairs of values are added, two quadrangles along the direction and two quadrangles across the direction, for a total number of eight values. As an example, for the Upper Right to Bottom Left direction (2), the added values are:

Quad 2+Quad 3 (in the "along" direction); and

Quad 1+Quad 4 (in the "across" direction).

Gradient measurements from the bright to the dark side of a pixel will produce positive values, whereas gradient measurements from the dark to the bright side of a pixel will produce negative values. Pixels showing both sides equally bright, such as pixels located in a "crest" or a "trough," will yield quadrangle pairs with opposite signs resulting in a low absolute gradient value. It will be appreciated that low gradient values will also occur for pixels surrounded by neighbours with equal brightness.

Figure 7B:
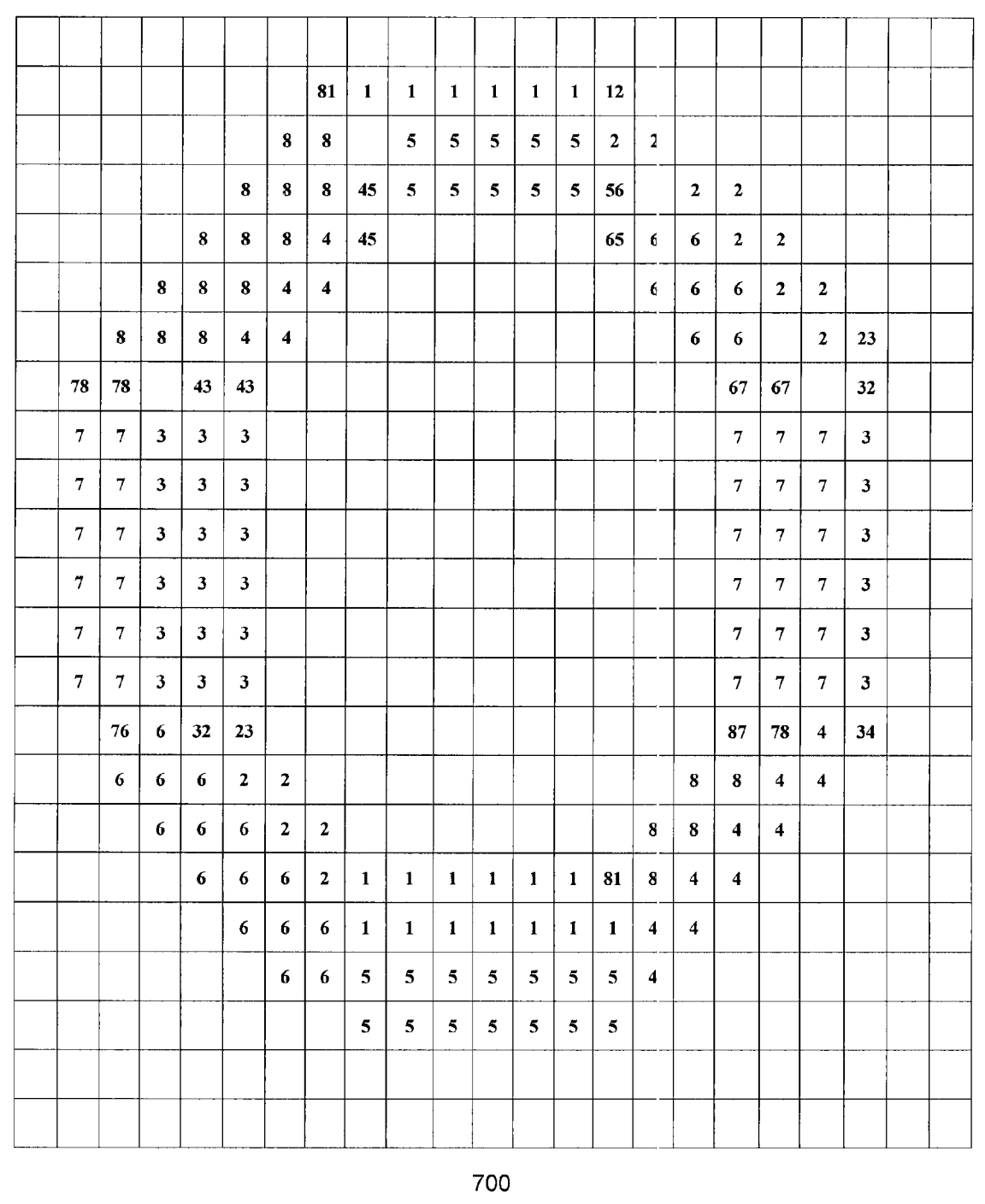

Using all of the above noted results, the resulting set of gradient intensity values are sorted by the intensity magnitude. In the provided embodiment, there are sixteen values. The highest value and its associated directional value will be retained as the pixel total gradient value. With regards to the directional value, if the second highest intensity directional value is more than a predetermined threshold, for example 50% of the highest value, this directional value is combined with the directional value of the highest directional code to form a two-figure value to be stored into the directional value channel (FIG. 7B). The additional directional value may prove to be useful in assessing the directional compatibility of neighbouring pixels. Otherwise, only the directional value associated with the highest value is stored. These values are stored by image processing software as data in database 118.

Referring to the values of graph 502 in FIG. 5B, the highest gradient value (202) for the central pixel is computed for directional value (1) (see FIGS. 7A and 7B). Gradient measurements for all other directions, i.e., (2) to (8), produced either zero or negative values.

Referring to FIGS. 4A and 6, execution of first stage 202 by image processing software 116 on image 400 produces image 600. As shown in image 600, two well-defined high gradient intensity bands surround a low intensity core of the octagon. To provide additional numerical detail, and referring to FIG. 4B, execution of first stage 202 by image processing software 116 produces the intensity gradient values shown on FIG. 7A and the directional values shown on FIG. 7B. In FIG. 7B, notice the two-digit codes located in the octagon's corners.

For process 204, the 3×3 pixel arrays used contain gradient intensity and directional data obtained by process 202. These data are evaluated to identify any possible mini-vector that may or should be associated with the center pixel of the array to define an edge line element. Initially, all mini-vectors connecting a non-zero gradient intensity pixel to two non-zero gradient intensity pixels are retained as possible edge line elements. Thereafter, the embodiment may eliminate unwanted mini-vectors in two steps.

Figure 3A:
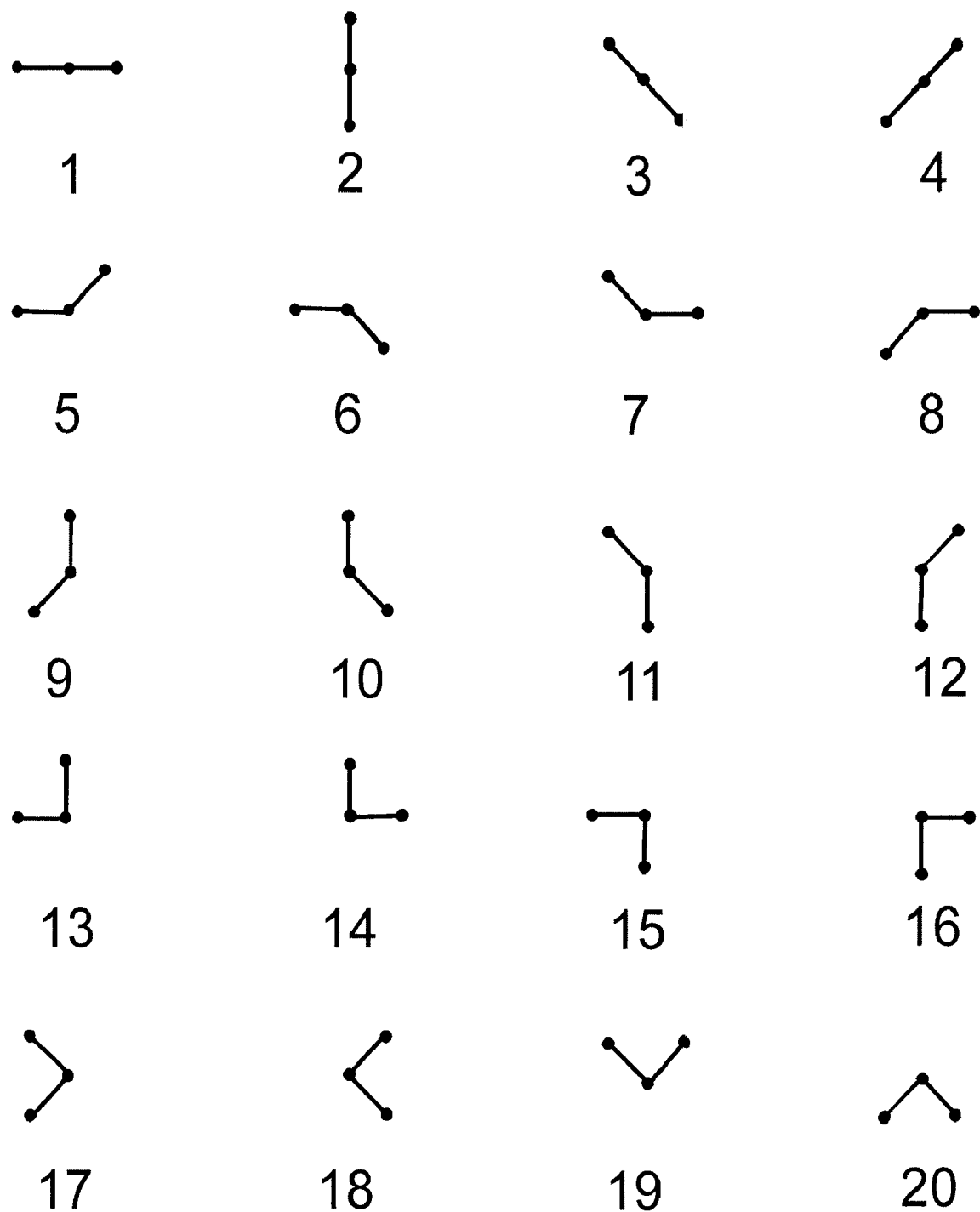
FIG. 3A is a collection of exemplary mini-vectors used by the image processing software of FIG. 1A.

In the first step, the directional value of the central element of a mini-vector is compared to the directional values of the two other pixels making up the mini-vector to determine directional compatibility. This process is repeated for each of the 20 mini-vector patterns (FIG. 3A). The compatibility table for the twenty mini-vectors is shown in FIG. 3B. This table indicates the ideal combination of directional values for the two segments of each mini-vector type. There are two pairs of valid combinations for each mini-vector type, for opposite sides of directional values (compare octagon's directional pixel data table of FIG. 7B with octagon's mini-vector pixel data table of FIG. 9). It will be appreciated that image processing software 116 may encounter variability in calculations caused by the effects of minor local fluctuations in intensity values. As such an embodiment preferably allows for tolerance of such fluctuations. Therefore, the tolerance level in terms of directional compatibility is set at 45 degrees from the ideal values shown in FIG. 3B. As an example, a mini-vector type 1 that ideally should contain only pixels with directional value 1 or 5, can in fact contain pixels with directional values 1, 2 and 8 or 5, 4, and 6.

Having reduced the original set of 20 primary mini-vectors to a reduced set containing directionally compatible pixels, in the second step, these mini-vectors are compared to two mini-vectors selected among the twenty auxiliary mini-vectors of the array. The two selected mini-vectors are those that are on both sides of the centrally positioned mini-vector being analyzed within the 9-pixel array. As an example, for the mini-vector 1, which connects pixels 4, 5 and 6, the relevant (two) auxiliary mini-vectors are those that connect pixels 1, 2 and 3; and pixels 7, 8 and 9. Mini-vector averages are computed for these (two) auxiliary mini-vectors by adding intensity values of those pixels that are directionally compatible with the central mini-vector pixels. If any of these two auxiliary mini-vector averages results in a greater average value than the centrally located, or primary, vector, the centrally located vector will be discarded since it cannot be a "crest" edge line mini-vector.

Typically, a small number of mini-vectors, say 1 to 4, result in being potential edge-line elements after process 204 has gone through the first two steps. The third and final step of process 204 consists of reducing the number of mini-vectors to a maximum of two. This pair must have a segment in common. The mini-vector that has the greatest average value and another vector among the others (if there is one) that has both a segment in common with the first vector and the greatest average value, will be selected to produce an output pair for process 204 (there are 160 possible two-vector codes by coupling the twenty vectors in such a fashion). Otherwise, if there is only one vector, a code from 1 to 20 will be used. Non-edge pixels will be assigned zero values for both intensity value and vector code.

Figure 8:
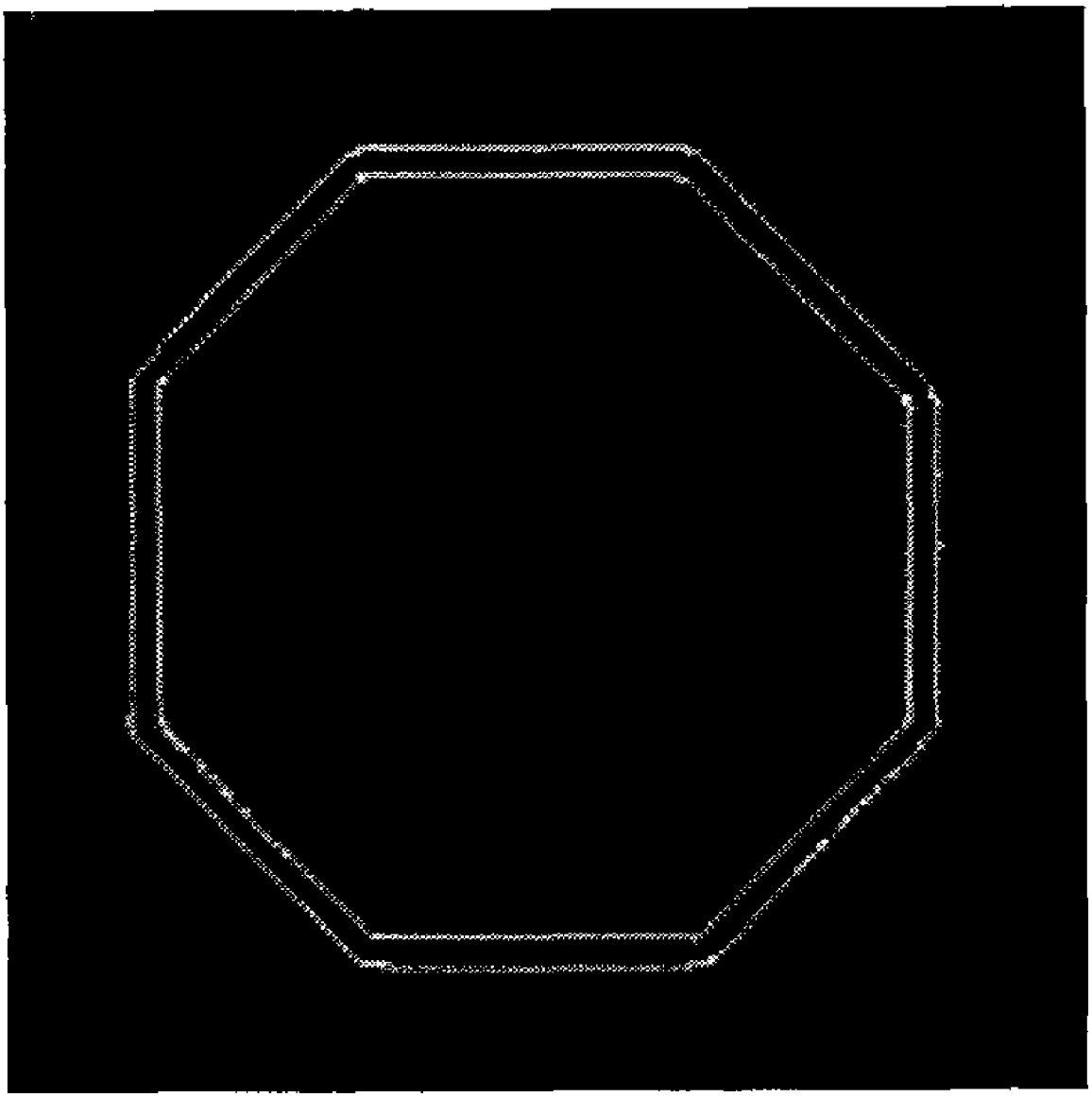
FIG. 8 is a representation of an image identifying edges for the test object of FIG. 4A generated by the image processing software of FIG. 1A after executing the second stage in its process as shown in FIG. 2.

Referring to FIGS. 6 and 8, further refinement of the edge data expressed in image 600 (output data of process 202) are shown by image 800 (output data of process 204). Image 800 shows that, in a case where the black octagon lines are in sharp contrast to the white background, the embodiment of stage 204 can extract well-defined, mostly single-pixel, edge lines. In a more conventional image, where edge lines are not so sharply defined, output data after process 204 will show thicker edge lines.

To reduce edge lines obtained after stage 204 to a single-pixel dimension, two consecutive processes are utilized, 206 and 208.

For process 206, the 3×3 pixel arrays used contain mini-vector data obtained by process 204 for the central pixel and its eight neighbours. Process 206 entails analyzing the degree of connectivity between the central mini-vector(s) and two of its neighbouring mini-vectors and eliminating the central mini-vector that does not adequately or properly connect. To be connected to two of its neighbours, a central mini vector should show that each one of its two segments match the direction of the segment in common with the specific neighbour. A 45 degrees difference in matching mini-vectors segment directions is tolerated.

Process 208, the fourth and last stage, consists of recalculating jointly the mini-vectors averages of the primary and auxiliary mini-vectors, and retaining only as edge pixels those pixels where a primary mini-vector average is the greatest.

Figure 9:
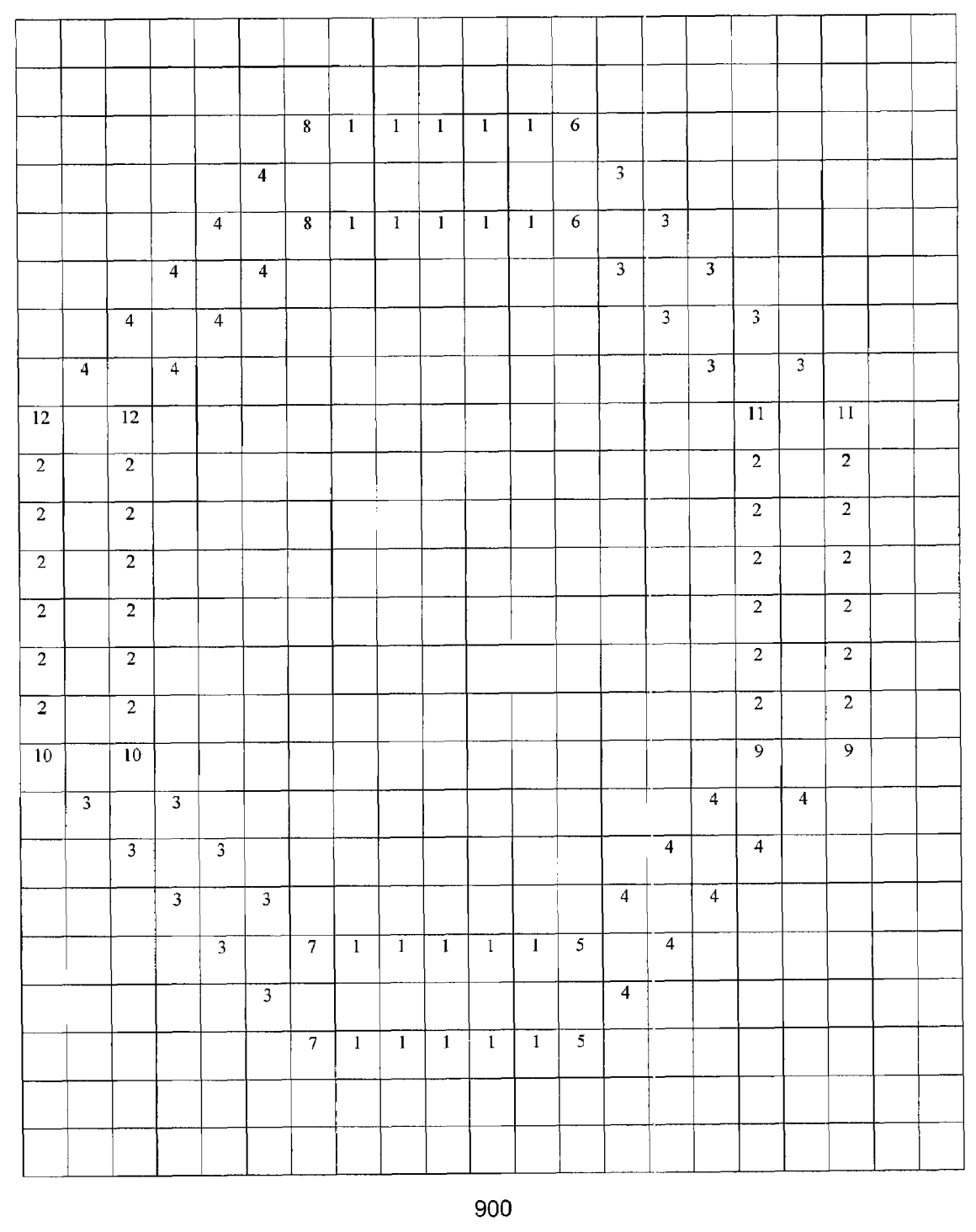

FIG. 9 shows table 900 comprising the mini-vectors obtained as a result of the fourth stage executed by the image processing on the image data of FIG. 4B, and showing the first of the two-vector codes that have been identified for that pixel.

Figure 10:
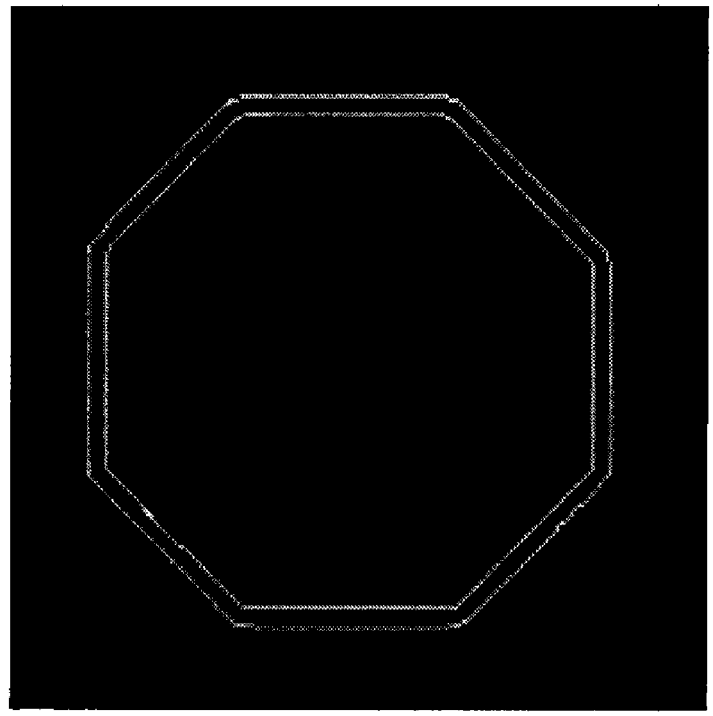
FIG. 10 is a representation of a final image showing edges for the image of FIG. 4A as generated by the image processing software of FIG. 1A after executing the fourth stage in its process as shown in FIG. 2.

FIG. 10 provides further detail on the final processing stage of image 400 by showing that image processing software 116 can consistently extract single-pixel edge lines from such image.

Figure 11:
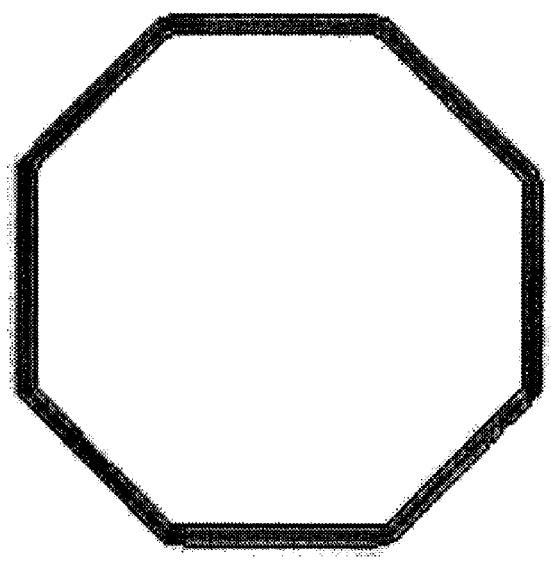
FIG. 11 is a representation of a correlation image showing the image of FIG. 10, as generated by the image processing software of FIG. 1A after executing the fourth stage in its process as shown in FIG. 2, overlapped with the original image of FIG. 4A.

FIG. 11 illustrates a resulting image 1100 created by an embodiment showing that the single-pixel edge lines shown in FIG. 10 consistently coincide with the "best" boundary line between black and white in the original image of FIG. 4A. Image 1100 shows the edge lines of image 1000 superimposed as black lines onto image 400.

As noted, the above examples and processes have been applied to images that are represented in greyscale only. For images that have a colour component, the above noted processes of an embodiment may be used. One process may convert and/or filter the colour components of an image to a greyscale image, and then process the grey-scale image as described above. Another process may separate the colour image into two or more separate colour component images (e.g. only green components, only blue components and/or only reds components). The process would then apply an image processing algorithm according to an embodiment and then calculate an edge for the original image based on calculations that combine the results of the edges determined for each component. A weighting of values among the different component may be provided.

It will be appreciated that the image processing software and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Different signalling techniques may be used to communicate information between applications using known programming techniques. Known data storage, access and update algorithms allow data to be shared between applications. It will further be appreciated that other applications and systems on unit 104 may be executing concurrently with a module of the image processing software. For example, the process may be implemented in a recursive routine.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

The invention claimed is:

1. A method of identifying an edge of an object in an image, comprising:
   identifying a pixel-array of the image and a central pixel in the array;
   identifying a set of mini-vectors as possible edges for the central pixel, utilizing a calculated gradient figure for the center pixel; and
   producing a reduced set of mini-vectors for the central pixel from the set of mini-vectors by removing mini-vectors that do not generate a continuous edge with an adjacent mini-vector edge in an adjacent pixel-array in the image.

2. The method of identifying an edge of an object in an image as claimed in claim 1, further comprising:
   analyzing the reduced set of mini-vectors to attempt to eliminate excess width from the identified edge.

3. The method of identifying an edge of an object in an image as claimed in claim 2, wherein identifying said set of mini-vectors as possible edges of the object for the pixel-array further comprises utilizing directional data associated with each pixel of a mini-vector.

4. The method of identifying an edge of an object in an image as claimed in claim 3, wherein identifying said set of mini-vectors as possible edges of the object for the pixel-array comprises:
   computing local gradient values in overlapping sections in the pixel-array in multiple directions; and
   adding local gradients to compute the calculated gradient figure for the center pixel.

5. The method of identifying an edge of an object in an image as claimed in claim 4, wherein:
   the overlapping sections are smaller squares within the pixel-array and each overlapping section includes the center pixel.

6. The method of identifying an edge of an object in an image as claimed in claim 5, wherein:
   differences of intensity values of pixels measured in multiple directions in each section are used to determine local gradients for the sections;
   the differences are adjusted by a factor to account for different distances between pixels within sections;
   the differences are added in paired sections along multiple directions to produce gradient figures for the center pixel; and
   the largest gradient figure of the gradient figures is selected as the calculated gradient for the center pixel; and
   the direction along which the largest gradient figure was obtained is selected as the gradient directional value for the center pixel.

7. The method of identifying an edge of an object in an image as claimed in claim 6, wherein the second largest gradient directional value of the gradient figures for the center pixel is retained for further assessment.

8. The method of identifying an edge of an object in an image as claimed in claim 7, wherein said reduced set of mini-vectors having directionally compatible pixels is produced by:
   comparing the direction value of the central pixel against directional values of the two other pixels at the ends of a particular mini-vector to deter nine directional compatibility of that particular mini-vector with the central pixel; and
   removing the particular mini-vector from the set of mini-vectors if it is not sufficiently compatible.

9. The method of identifying an edge of an object in an image as claimed in claim 8, wherein the reduced set of mini-vectors is further reduced by:
   comparing gradient intensity averages of each mini-vector in the remaining set against two mini-vectors that flank each side of the centrally positioned mini-vector in the array; and
   computing mini-vector averages for these flanking mini-vectors by adding intensity values of those pixels that are directionally compatible with pixels in the central mini-vector; and
   removing the particular mini-vector from the set of mini-vectors if its intensity average is smaller than either one of the flanking mini-vectors.

10. A computer for identifying an edge of an object in an image, comprising:
    a display for displaying the image;
    memory to store a digital representation of the image;
    a microprocessor;
    software operating on said microprocessor, having
        a module to access the digital representation of the image and to identify a pixel-array of the image and a central pixel in the pixel-array;
        a module to identify a set of mini-vectors as possible edges for the central pixel, utilizing a calculated gradient figure for the center pixel; and
        a module to produce a reduced set of mini-vectors from the set of mini-vectors by removing mini-vectors that do not generate a continuous edge with an adjacent edge in an adjacent pixel-array in the image.

11. The computer for identifying an edge of an object in an image as claimed in claim 10, wherein the software further comprises:

a module to analyze the reduced set of mini-vectors to attempt to eliminate excess width from the identified edge.

12. The computer for identifying an edge of an object in an image as claimed in claim 11, wherein the module to identify the set of mini-vectors utilizes direction data associated with the central pixel.

13. The computer for identifying an edge of an object in an image as claimed in claim 12, wherein the module to identify the set of mini-vectors as possible edges of the object for the pixel-array:
   compares local gradient values in overlapping sections in the pixel-array;
   computes differences of the local gradient values between overlapping sections; and
   adds the differences to compute the calculated gradient for the center pixel.

14. The computer for identifying an edge of an object in an image as claimed in claim 13, wherein:
   the pixel-array is square-shaped;
   the overlapping sections are smaller squares with the pixel-array and each overlapping section includes the center pixel;
   intensity values of pixels in each section are used to determine the local gradient for the section;
   the differences are adjusted by a factor to account for the distance between the overlapping sections;
   the differences are added in pairs to produce gradient figures for the sections; and
   the largest gradient figure of the gradient figures is selected as the calculated gradient for the center pixel.

15. The computer for identifying an edge of an object in an image as claimed in claim 14, wherein the second largest gradient figure of the gradient figures for the center pixel is retained in the memory for further assessment.

16. The computer for identifying an edge of an object in an image as claimed in claim 15, wherein the module to produce the reduced set of mini-vectors:
   compares the direction value of the central pixel against directional values of the two other pixels at the ends of a particular mini-vector to determine directional compatibility of that particular mini-vector for the central pixel; and
   removes the particular mini-vector from the set of mini-vectors if it is not sufficiently compatible.

17. The computer for identifying an edge of an object in an image as claimed in claim 16, wherein the module to produce the reduced set of mini-vectors further identifies same by:
   comparing the mini-vectors in set against two mini-vector, that flank each side of a central mini-vector positioned centrally in the pixel-array; and
   computing mini-vector averages these flanking mini-vectors by adding intensity values of those pixels that are directionally compatible with pixels in the central mini-vector.

18. The method of identifying an edge of an object in an image as claimed in claim 1, wherein identifying said set of mini-vectors as possible edges of the object for the pixel-array comprises:
   computing local gradient values in overlapping sections in the pixel-array in multiple directions; and
   adding local gradients to compute the calculated gradient figure for the center pixel.

19. The method of identifying an edge of an object in an image as claimed in claim 1, wherein said reduced set of mini-vectors having directionally compatible pixels is produced by:
   comparing the direction value of the central pixel against directional values of the two other pixels at the ends of a particular mini-vector to determine directional compatibility of that particular mini-vector with the central pixel; and
   removes the particular mini-vector from the set of mini-vectors if it is not sufficiently compatible.

* * * * *